(12) United States Patent
Frolov (10) Patent No.: US 8,752,462 B2
(45) Date of Patent: Jun. 17, 2014

(54) DUST MANAGEMENT SYSTEM IN A TABLE SAW

(75) Inventor: Andrew Frolov, Glenview, IL (US)

(73) Assignee: Robert Bosch GmbH, Stuttgart (DE)

( * ) Notice: Subject to any disclaimer, the term of this patent is extended or adjusted under 35 U.S.C. 154(b) by 415 days.

(21) Appl. No.: 12/856,568

(22) Filed: Aug. 13, 2010

(65) Prior Publication Data
US 2012/0036972 A1 Feb. 16, 2012

(51) Int. Cl.
*B26D 7/06* (2006.01)
*B26D 7/08* (2006.01)
*B26D 1/18* (2006.01)
*B23D 59/00* (2006.01)

(52) U.S. Cl.
CPC .................................. *B23D 59/006* (2013.01)
USPC ............................... 83/477.2; 83/100; 83/168

(58) Field of Classification Search
CPC ..... B23D 59/006; B23D 47/025; B27B 5/243
USPC .......... 83/98, 100, 168–170, 477–477.2, 581;
144/252.1; 15/301, 347, 352, 327.1;
451/453, 456
See application file for complete search history.

(56) References Cited

U.S. PATENT DOCUMENTS

| 1,552,665 | A | * | 9/1925 | Authenrieth | 83/168 |
| 2,044,481 | A | * | 6/1936 | Manley et al. | 144/252.1 |
| 2,054,932 | A | * | 9/1936 | Fleming | 451/456 |
| RE20,687 | E | * | 4/1938 | Grozier | 83/100 |
| 2,236,232 | A | * | 3/1941 | Brescka et al. | 451/453 |
| 2,711,061 | A | * | 6/1955 | Fegert | 451/456 |
| 2,729,927 | A | * | 1/1956 | D Arcey | 451/456 |
| 3,007,501 | A | * | 11/1961 | Mundell et al. | 144/252.1 |
| 3,394,500 | A | * | 7/1968 | Lill et al. | 451/276 |
| 3,444,670 | A | * | 5/1969 | Hungate | 96/356 |
| 4,063,478 | A | * | 12/1977 | Stuy | 83/100 |

(Continued)

FOREIGN PATENT DOCUMENTS

| DE | 4424615 A1 | 1/1996 |
| DE | 202004004463 U1 | 8/2004 |
| WO | 2004045814 A1 | 6/2004 |

OTHER PUBLICATIONS

Amazon website page "Bosch 4100-09 10-Inch Worksite Table Saw with Gravity-Rise Stand"; http://www.amazon.com . . . ; published at least as early as Aug. 10, 2010; (1 page).

(Continued)

*Primary Examiner* — Ghassem Alie
*Assistant Examiner* — Bharat C Patel
(74) *Attorney, Agent, or Firm* — Maginot, Moore & Beck (57) ABSTRACT

A table saw includes a table top having an opening configured to receive a saw blade, and a motor positioned under the table top and configured to rotate the saw blade about an axis of rotation. The saw blade includes a midline that extends through the saw blade at the axis of rotation and is perpendicular with respect to the table top when the saw blade is perpendicular with respect to the table. A blade case is positioned under the table top that includes a blade chamber defined by a first wall on one side of the blade, a second wall on an opposite side of the blade, and a third wall along an outer perimeter of the blade chamber. At least one dust deflector positioned within the blade chamber between the axis of rotation and the third wall of the blade chamber that extends through the midline.

14 Claims, 8 Drawing Sheets

(56) References Cited

U.S. PATENT DOCUMENTS

| | | | | |
|---|---|---|---|---|
| 4,192,104 A * | 3/1980 | Patenaude | ............ | 451/456 |
| 4,241,505 A * | 12/1980 | Bodycomb et al. | ............ | 30/390 |
| 4,255,995 A * | 3/1981 | Connor | ............ | 83/100 |
| 4,326,864 A * | 4/1982 | Sittler | ............ | 55/364 |
| 4,367,665 A * | 1/1983 | Terpstra et al. | ............ | 83/100 |
| 4,385,539 A * | 5/1983 | Meyerhoefer et al. | ............ | 83/473 |
| 4,576,072 A | 3/1986 | Terpstra et al. | | |
| 4,742,743 A | 5/1988 | Scarpone | | |
| 4,875,398 A | 10/1989 | Taylor et al. | | |
| 5,033,192 A * | 7/1991 | Franz et al. | ............ | 30/124 |
| 5,123,317 A * | 6/1992 | Barnes et al. | ............ | 83/98 |
| 5,158,001 A * | 10/1992 | Udelhofen et al. | ............ | 83/100 |
| 5,181,447 A | 1/1993 | Hewitt | | |
| 5,231,906 A | 8/1993 | Kogej | | |
| 5,537,748 A * | 7/1996 | Takahashi et al. | ............ | 30/124 |
| 5,588,213 A | 12/1996 | Swanberg | | |
| 6,009,782 A * | 1/2000 | Tajima et al. | ............ | 83/99 |
| 6,131,629 A * | 10/2000 | Puzio et al. | ............ | 144/252.1 |
| 6,139,411 A * | 10/2000 | Everts et al. | ............ | 451/359 |
| 6,370,997 B1 | 4/2002 | Rugen et al. | | |
| 6,470,778 B1 | 10/2002 | Kaye, Jr. et al. | | |
| 6,503,125 B1 * | 1/2003 | Harrington | ............ | 451/28 |
| 6,530,303 B1 * | 3/2003 | Parks et al. | ............ | 83/473 |
| 6,736,042 B2 * | 5/2004 | Behne et al. | ............ | 83/440.2 |
| 6,796,208 B1 * | 9/2004 | Jorgensen | ............ | 83/100 |
| 6,966,350 B1 | 11/2005 | Gist | | |
| 7,241,211 B2 * | 7/2007 | Baratta | ............ | 451/455 |
| 7,654,181 B2 * | 2/2010 | Quinlan | ............ | 83/100 |
| 2002/0025767 A1 * | 2/2002 | Chen | ............ | 451/259 |
| 2003/0089212 A1 * | 5/2003 | Parks et al. | ............ | 83/473 |
| 2004/0248507 A1 * | 12/2004 | Brazell et al. | ............ | 451/361 |
| 2006/0042440 A1 * | 3/2006 | Quinlan | ............ | 83/100 |
| 2006/0201302 A1 * | 9/2006 | Schwaiger et al. | ............ | 83/477.2 |
| 2007/0044609 A1 * | 3/2007 | Brazell et al. | ............ | 83/100 |
| 2007/0074612 A1 * | 4/2007 | Yu | ............ | 83/477.2 |
| 2010/0307308 A1 * | 12/2010 | Butler | ............ | 83/100 |

OTHER PUBLICATIONS

Amazon website page "DeWalt DW745 Heavy-Duty 10-Inch Compact Job-Site Table Saw with 16-Inch Max Rip Capacity"; http://www.amazon.com . . . ; published at least as early as Aug. 10, 2010; (1 page).

Amazon website page "Hitachi C10RB 10-Inch Portable Jobsite Table Saw with Stand"; http://www.amazon.com . . . ; published at least as early as Aug. 10, 2010; (1 page).

Amazon website page "Makita 2704 Contractors 15 Amp 10-Inch Benchtop Table Saw"; http://www.amazon.com . . . ; published at least as early as Aug. 10, 2010; (1 page).

Amazon website page "Metabo TS250 10-Inch Table Saw without Stand": http://www.amazon.com . . . ; published at least as early as Aug. 10, 2010; (1 page).

International Search Report in corresponding PCT Application (i.e., PCT/US2011/046876), mailed Nov. 17, 2011 (12 pages).

* cited by examiner

DUST MANAGEMENT SYSTEM IN A TABLE SAW

FIELD

The invention relates to a power table saw, and in particular to a dust management system within the table saw.

BACKGROUND

Table saws are used in the construction and wood milling industries. When a blade of a table saw comes in contact with a workpiece, e.g., a piece of lumber, to cut the workpiece, dust and debris are generated as a result of the cutting. Table saws are typically equipped with dust management and collection features. An example of a prior art table saw with a dust management system is depicted in FIG. 13 (titled "Prior Art").

Figure 13:
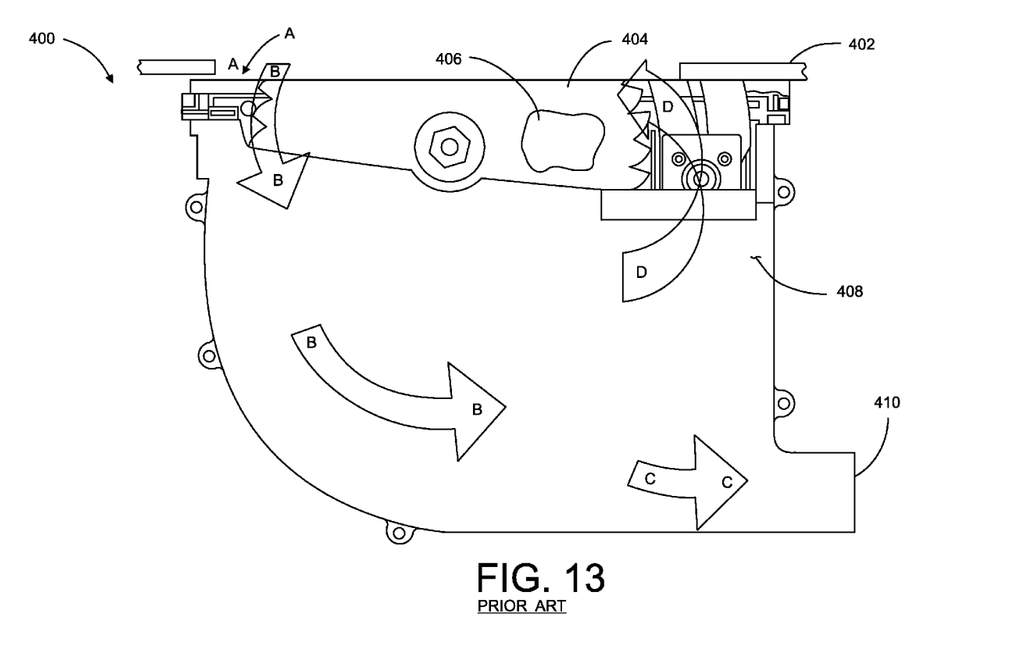
FIG. 13 depicts a plan view of a prior art table saw.

A table saw 400 depicted in FIG. 13 includes a table top 402 with a saw blade opening formed therein for receiving a saw blade 404. The saw blade 404 is configured to cut a workpiece by turning in a counterclockwise direction as depicted by an arrow A-A.

The saw blade 404 is partially enclosed within an enclosure defined by a support arrangement 406 (depicted through an opening provided on the saw blade 404 for clarity of figure) and a cover 408. The enclosure terminates at the saw blade opening at a top portion and a dust port 410 at a bottom portion which is coupled to a dust bag (not shown) or a vacuum system (not shown).

The enclosure forms a path for the dust and debris generated when the saw blade 404 comes in contact with the workpiece. This path is defined by counterclockwise sections that are depicted by arrows B-B, C-C, and D-D. The dust and debris first enter the enclosure and partially travel within the enclosure, according to the arrows B-B. Part of the dust and debris exit the table saw 10 through the dust port 410, as depicted by the arrow C-C, into the dust bag (not shown) or removed by the vacuum system (not shown). However, part of the dust and debris may continue the counterclockwise rotation, as depicted by the arrow D-D, and exit out of the table saw 400 through the saw blade opening at a high rate of speed, which can be annoying to the user of the table saw 400.

In addition, part of the dust and debris that enter the saw blade opening (along the arrow B-B) can settle into various components of the table saw 400. For example, dust and debris which enter through the saw blade opening can settle into blade gullets (i.e., the space between the saw blade teeth) which can be thrown at the user when the blade gullets rotate above the table top 402. Other components, e.g., a motor coupled to the saw blade 404, may also be negatively affected as a result of the intrusion of dust and debris. As a result, while dust and debris are channeled into the enclosure, typically table saws of the prior art do not effectively manage the dust and debris within the enclosure.

Therefore, it is highly desirable to provide a dust management system which not only minimizes dust and debris that escape the enclosure, but also minimize dust and debris that settle into components of the table saw.

SUMMARY

According to one embodiment of the present disclosure, there is provided a table saw. The table saw includes a table top which includes an opening configured to receive a saw blade, and a motor positioned under the table top and configured to rotate the saw blade about an axis of rotation, wherein a midline that defines a front portion and a rear portion of the saw blade extends through the saw blade at the axis of rotation and is perpendicular with respect to the table top when the saw blade is perpendicular with respect to the table. The table saw further includes a blade case positioned under the table top, the blade case including a blade chamber defined by a first wall on one side of the blade, a second wall on an opposite side of the blade, and a third wall along an outer perimeter of the blade chamber. The table saw also includes at least one dust deflector positioned within the blade chamber between the axis of rotation and the third wall of the blade chamber, the at least one dust deflector extending through the midline.

According to another embodiment of the present disclosure, there is provided a power tool. The power tool includes a table top which includes an opening configured to receive a saw blade and a carriage positioned under the table top, the carriage including a blade chamber comprising a first sidewall, a second side wall, and an outer wall, wherein an open window is provided in the first side wall. The power tool further includes a motor carried by the carriage, the motor including a drive shaft configured to rotate the saw blade within the blade chamber about an axis of rotation, the drive shaft extending through the window to the blade chamber. The power tool also includes at least one dust deflector positioned within the blade chamber between the axis of rotation and the outer wall of the blade chamber, the at least one dust deflector extends substantially around a front portion of the window in the first side wall.

According to yet another embodiment of the present disclosure, a table saw is provided. The table saw includes a support arrangement and a table top assembly connected to the support arrangement, the table top assembly includes a saw blade opening. The table saw further includes a saw assembly supported under the table top assembly, the saw assembly including a circular saw blade that extends through the saw blade opening, and a dust directing assembly coupled to the saw assembly. The dust directing assembly includes (i) a dust inlet positioned substantially below the saw blade opening, (ii) a dust channel, the dust channel including: (a) an inner dust deflector forming a first periphery of the dust channel, (b) an outer wall opposite the inner dust deflector, the outer wall forming a second periphery of the dust channel, and (c) a cover extending between the inner dust deflector and the outer wall, the cover configured to substantially enclose the dust channel and provide a saw blade cavity for the saw blade, and (iii) a dust outlet, wherein the inner dust deflector is extends substantially from the dust inlet to the dust outlet.

DESCRIPTION

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one of ordinary skill in the art to which this invention pertains.

As a blade of a table saw assembly comes in contact with a workpiece, dust and debris are generated. The embodiments described in the present disclosure provide structures that urge dust and debris to travel along a pre-defined path from the source (i.e., the workpiece) to a transfer/collection point. Furthermore, structures described herein also manage dust and debris out of various components of the table saw assembly.

General Table Saw Arrangement

Figure 1:
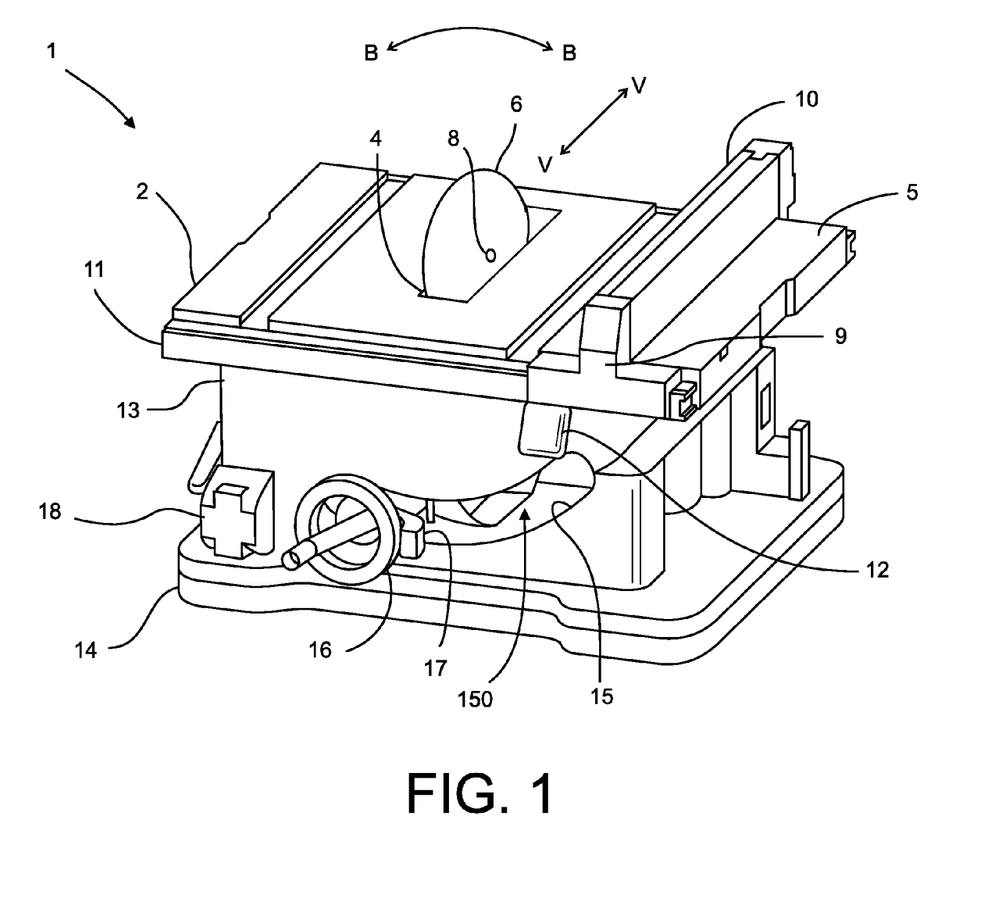
FIG. 1 depicts a perspective view of a table saw including a table top with a saw blade opening, a saw blade extending through the saw blade opening, and a support arrangement.

Referring to FIG. 1, a table saw assembly 1 is depicted. The table saw assembly 1 includes a table top 2 which includes a saw blade opening 4. A saw blade 6 extends through the saw blade opening 4 and is configured to rotate about an axis passing through a coupling 8. A window is provided about the saw blade opening 4 to partially depict the saw blade 6 and particularly the coupling 8, below the surface of the table top 2.

The table saw assembly 1 also includes a rip fence 10 and a table extension 5. The table extension 5 is coupled to the table top 2 via rails 11 and the lever lock 12. The rip fence 10 is coupled to the table top 2 or the table extension 5 via rails 11 and a lock 9. The lock 9 enables a user to lock the rip fence 10 in a stationary position with respect to the table top 2 and the rails 11.

The table saw assembly 1 further includes a housing 13 coupled to a base portion 14 and which includes an arcuate opening 15. The arcuate opening 15 receives a blade position adjustment mechanism which includes a wheel 16 for adjusting the height of the saw blade 6 about the table top 2 and a bevel adjustment lever 17 which controls the bevel angle of the saw blade 6. There is also an on/off switch 18 depicted in FIG. 1 which provides power to the table saw assembly 1. Also, through the arcuate opening 15, a support arrangement 150 is depicted, which is further described with reference to FIGS. 2 and 3.

The table saw assembly 1 may be of a push-pull type where a workpiece to be shaped is placed on the table top 2 and remains stationary while the saw blade 6 is moved along an axis defined by arrows V-V. Alternatively, the table saw assembly 1 may of the type where the saw blade 6 remains stationary with respect to the axis defined by the arrows V-V, and the workpiece is moved toward the saw blade 6.

Figure 2:
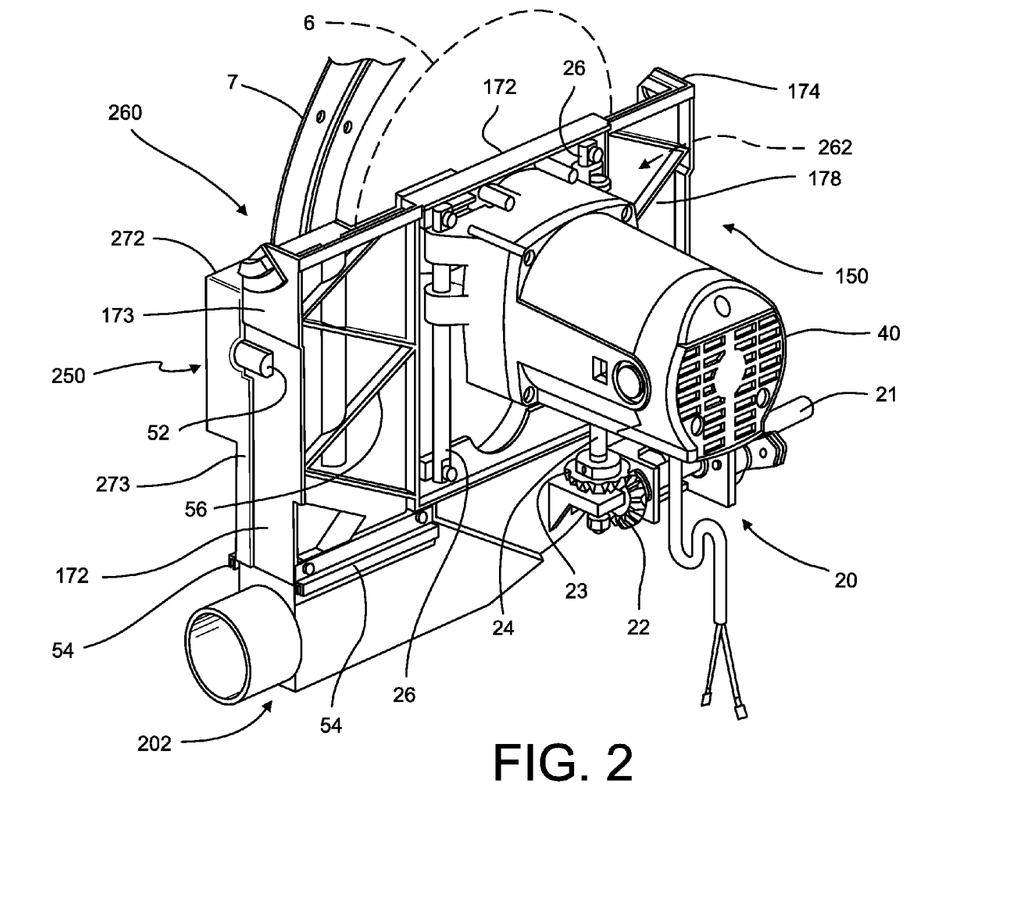
FIG. 2 depicts a perspective view of a blade case including the support arrangement of FIG. 1, a motor, a riving knife, and a cover assembly.

Referring to FIG. 2, a saw blade height adjustment mechanism 20 is depicted. The saw blade height adjustment mechanism 20 is known to a person of ordinary skill in the art and is therefore described herein, briefly. The saw blade height adjustment mechanism 20 includes a shaft 21 which is coupled to a beveled gear 22 which is coupled to another beveled gear 23. The beveled gear 23 is coupled to a rod 24 which interfaces with a threaded member 28 (shown in FIG. 11) which is fixedly coupled to a motor 40. The rod 24 includes a threaded portion 29 which interfaces with the threaded member 28. The motor 40 glides on the glide rods 26. Accordingly, by turning the shaft 21, the threaded portion 29 of the threaded rod 24 turns within the threaded member 28 which causes the motor 40, and the saw blade 6 attached thereto, to raise and lower with respect to the table top 2.

Also depicted in FIG. 2, is a perspective view of the support arrangement 150 coupled to a cover assembly 250. The cover assembly 250 couples to a support wall 172 of the support arrangement 150 with fastener assemblies 52. At one periphery of the support wall 172 is a side wall 173 and at another periphery is another side wall 174. The cover assembly 250 includes a side wall 273 which is positioned adjacent the side wall 173, a side wall 274 (best shown in FIG. 7) which is positioned adjacent the side wall 174, and a cover wall 272 which is positioned between the side walls 273 and 274. The side walls 173 and 174 are in the form of a flange that are integrally formed with and are substantially perpendicular to the support wall 172. Similarly, the side walls 273 and 274 are in the form of a flange that are integrally formed with and are substantially perpendicular to the cover wall 272. The side wall 174, the periphery of the support wall 172 which joins the side wall 174, the side wall 274 and a periphery of the cover wall 272 which joins the side wall 274 (see FIGS. 2 and 7) are all arcuate in shape.

A combination of the support arrangement 150 and the cover assembly 250 form a blade case 260. The blade case 260 includes a blade chamber 262 which is defined by the support wall 172 on one side of the saw blade 6, the cover wall 272 on an opposite side of the saw blade 6, and the side walls 173/273 and 174/274 which are along outer perimeters of the blade chamber 262. As the motor 40 is coupled to the glide rods 26 which are connected to the support wall 172 (i.e., part of the blade case 260), the motor is also coupled to the blade case 260. Accordingly, the saw blade 6 is partially positioned within the blade case 260 and within the blade chamber 262 and is configured to move vertically within the blade chamber 262. The support wall 172 and the cover wall 274 are separated by a space defined by the width of the side walls 173/273 and 174/274, in which the blade chamber 262 is positioned.

Further depicted in FIG. 2 are glides 54. The glides 54 are provided on the support wall 172 and on the cover wall 272 of the cover assembly 250 in order to interface with a removable dust port 202, as described in greater detail below. Also depicted in FIG. 2 are "Z" shaped structures 56 included on an outward side 178 of the support wall 172. The "Z" shaped structures 56 are configured to reinforce the support wall 172 and further add rigidity to it. With the added rigidity of the "Z" shaped structures 56, the support wall 172 may be a molded plastic component or be made from other composite material. Also depicted in FIG. 2 is a riving knife 7 which is positioned adjacent to the saw blade 6. Configuration and function of the riving knife 7 is known to a person of ordinary skill in the art.

Figure 3:
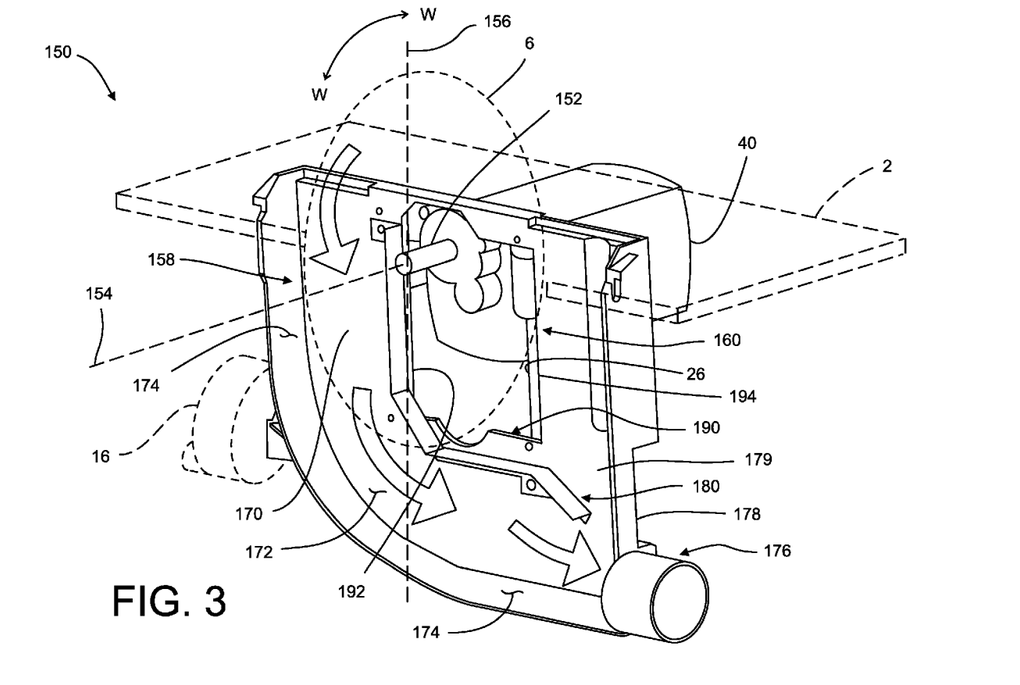
FIG. 3 depicts a perspective view of the support arrangement of FIGS. 1 and 2 including a dust deflector.

Referring to FIG. 3, a perspective view of the support arrangement 150 is depicted. The support arrangement 150 is positioned below the table top 2 and is configured to adjust its bevel angle with respect to the table top 2 (a partial portion of the table top 2 is depicted in FIG. 3, in phantom) along arrows W-W. The motor 40, depicted in FIG. 3, is positioned below the table top 2 and includes an output shaft 152. The saw blade 6 (depicted in phantom) is centrally positioned and removably coupled to the output shaft 152. The output shaft 152 defines an axis of rotation 154 that runs through the center of the saw blade 6 and the output shaft 152. A midline 156 is also depicted which divides the blade case 260 into a front portion and a rear portion. Accordingly, the midline 156 also divides the saw blade 6 into a front portion 158 and a rear portion 160. The midline 156 is (i) perpendicular with respect to the table top 2 when the blade case 260 and therefore the saw blade 6 are perpendicular with respect to the table top 2, and (ii) beveled with respect to the table top 2 when the blade case 260 and the saw blade 6 are beveled with respect to the table top 2.

Dust Management

The blade case 260 defines a dust channel 170, in which part of the saw blade 6 is positioned. At one end, the dust channel 170 extends form a side of the blade case nearest the saw blade opening 4 to a dust port 176 at an opposite side. The dust channel 170 is defined by support wall 172, the side wall 174, a dust deflector 180, a dust deflector 280 (depicted in FIGS. 7, 8, and 9), and the cover wall 272 of the cover assembly 250. The dust channel 170 is configured to urge dust and debris, which enter through the saw blade opening 4, to travel according to a path defined by the arrows X-X along the dust channel 170.

The dust deflector 180 forms one periphery of the dust channel 170. The dust deflector 180 is attached to the support wall 172 and in one embodiment (as depicted in FIG. 3) extends substantially from the table top 2 to the dust port 176. The dust deflector 180 is positioned between the axis of rotation 154 and the side wall 174. Furthermore, the dust deflector 180 extends through the midline 156 such that one portion of the dust deflector 180 is on one side of the midline 156 and another portion of the dust deflector is on the other side of the midline 156.

The support arrangement 150 further includes an open window 190 formed in the support wall 172. Portions of the motor 40 and the output shaft 152 extend through the window 190 from the outward side 178 of the support wall 172 to an inward side 179 of the support wall 172. The midline 156 divides the window into a front portion 192 and a rear portion 194. The dust deflector 180 extends substantially along the front portion 192 of the window 190.

Figure 4:
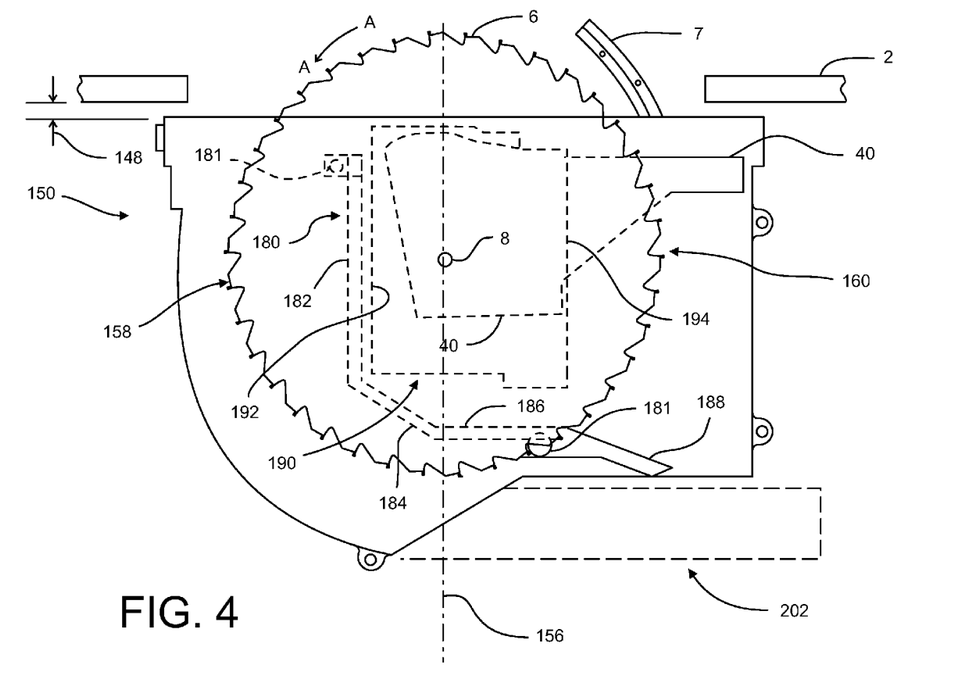
FIG. 4 depicts a plan view of the support arrangement of FIG. 1.

Referring to FIG. 4, a plan view of the support arrangement 150 is depicted. The midline 156 passes through the coupling 8. As described above, the midline 156 divides the saw blade 6 into a front portion 158 and a rear portion 160. The axis of rotation 154 (depicted in FIG. 3) is perpendicular to the page and extends outwardly from the coupling 8. The reader should appreciate that the saw blade 6 is depicted at different heights in FIGS. 1, 2, and 3. The height adjustment mechanism 20 (shown in FIG. 2) allows the user to raise and lower the motor 40 and the saw blade 6 attached thereto with respect to the support wall 172 of the support arrangement 150 and the table top 2. Also depicted in FIG. 4 is a space 148 that is between the table top 2 and the blade case 260 (see FIG. 2). The space 148 allows the blade case 260 to bevel with respect to the table top 2, thereby allowing the motor 40 attached to the blade case 260 and the saw blade 6 attached to the motor 40 to also bevel with respect to the table top 2.

Figure 5:
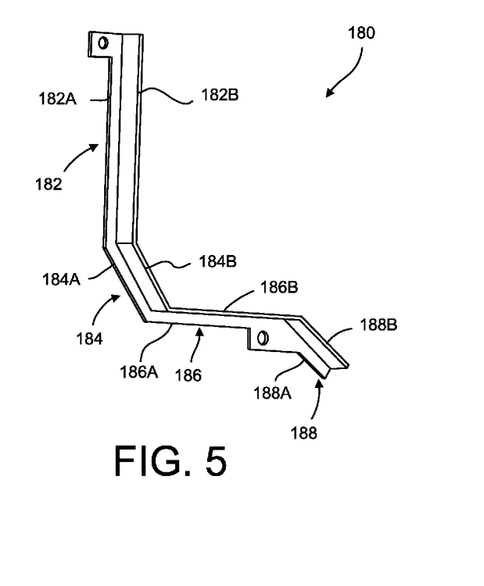
FIG. 5 depicts a perspective view of the dust deflector of FIGS. 3 and 4.

The dust deflector 180, further depicted in FIG. 5, includes mounting holes 181, a vertical portion 182, a diagonal/curved portion 184, a horizontal portion 186, and a dust outlet 188. In the embodiment depicted in FIG. 3, the dust outlet 188 leads to a dust port 176 (depicted in FIG. 3). Alternatively, the dust outlet 188 may terminate at a removable dust port 202 (depicted in phantom in FIG. 4, and best shown in FIG. 2) which is described in greater detail below. The vertical portion 182 is positioned substantially along the front portion 192 of the window 190 and to one side of the midline 156. The diagonal/curved and horizontal portions 184 and 186 of the dust deflector 180 cross the midline 156 leading to the dust outlet 188. Therefore, while one portion (i.e., the vertical portion 182) of the dust deflector 180 is on one side of the midline 156, a second portion (i.e., the dust outlet 188) is on another side of the midline 156.

The vertical portion 182, the diagonal/curved portion 184, and the horizontal portion 186 each includes a flange portion 182A, 184A, and 186A, respectively; and a dust deflection portion 182B, 184B, and 186B, respectively, that is substantially perpendicular to the respective flange portions (see FIGS. 3 and 5). The flange portions 182A, 184A, and 186A stay in contact with the support wall 172. Similarly, the dust outlet 188 includes a flange portion 188A that stays in contact with the support wall 172 and a dust deflection portion 188B that is substantially perpendicular to the flange portion 188A. The dust deflection portions 182B, 184B, 186B, and 188B are formed to be contiguous, and as described above are configured to direct dust and debris from the saw blade opening 4, along the path defined by the dust channel 170 toward the dust port 176 or the removable dust port 202 (see FIGS. 2 and 3).

Also depicted in FIG. 4 is the riving knife 7 positioned adjacent the backside 160 of the saw blade 6. The motor 40, when powered, rotates the saw blade 6 in the direction of the arrow A-A. The riving knife 7 is fixed relative to the saw blade 6 and moves with it as the user changes the vertical position of the saw blade 6 or the bevel angle of the blade case 260, thereby changing the bevel angle of saw blade 6.

Figure 6:
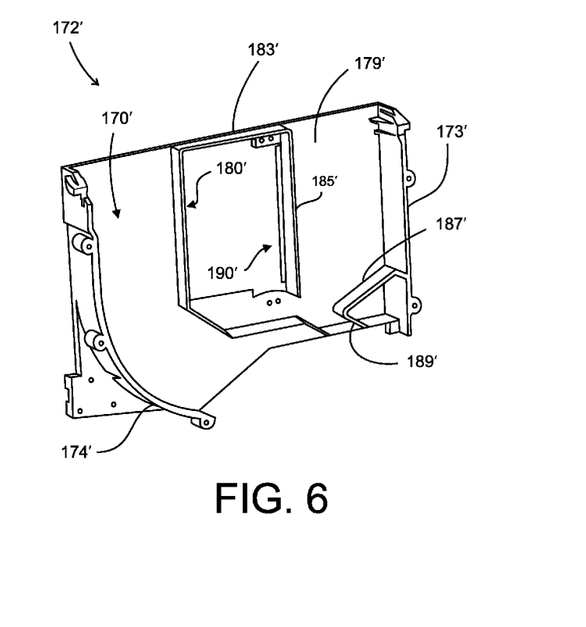
FIG. 6 depicts a partial perspective view of an alternative embodiment of the support arrangement of FIG. 1 with an integrated dust deflector.

Referring to FIG. 6, a partial perspective view of an alternative embodiment of a support wall 172' is depicted. The support wall 172' defines a dust channel 170' between the support wall 172', the side wall 174', a dust deflector 180', the dust deflector 280 (see FIGS. 7, 8, and 9), the cover wall 272 and the side wall 274 of the cover assembly 250 (see FIGS. 2 and 7). The dust deflector 180' is similarly shaped as compared to the dust deflector 180. However, the dust deflector 180' is integrally formed with an inward side 179' of the support wall 172'.

Also depicted in FIG. 6 is an open window 190' similar to the open window 190 depicted in FIGS. 3 and 4. While not shown in FIG. 6, the motor 40 (shown in FIGS. 2, 3, and 4) is configured to extend through the window 190'. The dust deflector 180' extends around the window 190' including a top portion 183' and a side portion 185'. These additional portions (i.e., 183' and 185') prevent dust and debris from entering into the window 190' and into the motor 40. Also, dust deflectors 187' and 189' are positioned adjacent a side wall 173' and further urge dust and debris to exist out of the dust channel through the dust port 176 or the removable dust port 202 (shown in FIGS. 2, 3, and 4).

Figures 7, 8, 9:
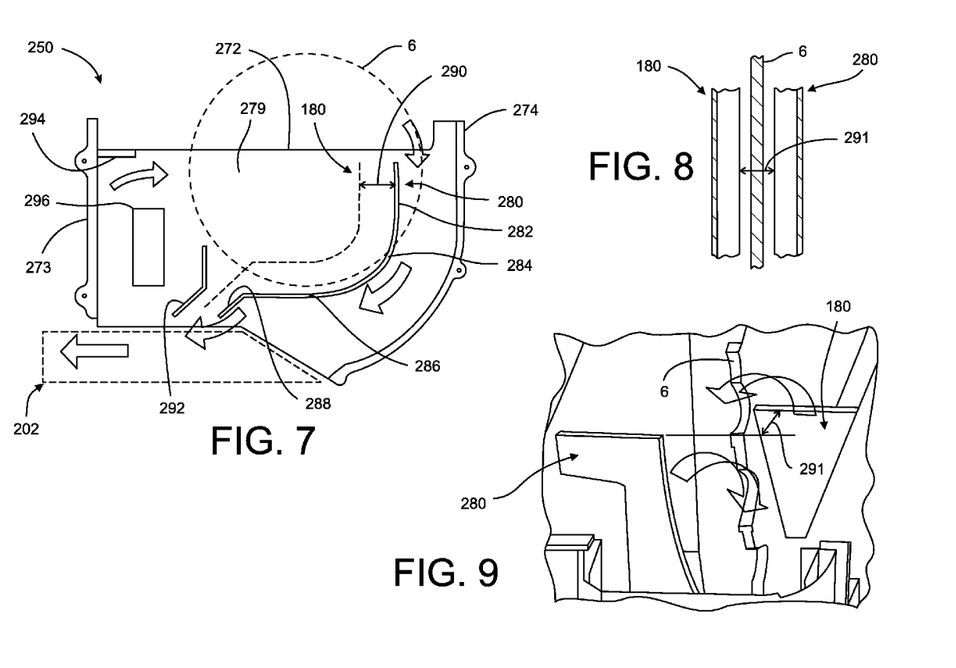
FIG. 7 depicts a plan view of the cover assembly of FIG. 2 including various dust deflectors, and an outline of a removable dust port.
FIG. 8 depicts a fragmentary cross sectional view of two adjacent dust deflectors of FIGS. 3 and 7.
FIG. 9 depicts a fragmentary perspective view of the two adjacent dust deflectors of FIG. 8.

Referring to FIG. 7, a plan view of the cover assembly 250 is depicted. The cover assembly includes the cover wall 272 which is shaped in a similar fashion as the support wall 172 of the support arrangement 150. The cover assembly 250 includes dust deflectors 280, 292, and 294. The dust deflector 280 is shaped similar to the dust deflector 180 (shown in phantom). Specifically, the dust deflector 280 includes a vertical portion 282, a diagonal/curved portion 284, a horizontal portion 286, and a dust outlet 288. The flanged portions 182A, 184A, 186A, and 188A of the dust deflector 180 are not shown (for clarity of figure). Also, the dust deflection portions 182B 184B, 186B, and 18B are not shown (for clarity of figure). Similar to the dust deflector 180, the dust deflectors 280, 292, and 294 may also includes flange portions (not shown) that are in contact with an inward side 279 of the cover wall 272 as well as dust deflection portions (not shown) that are substantially perpendicular with the respective flange portions.

While the dust deflector 292 is configured to further urge dust and debris to enter a space defined by the removable dust port 202 (shown in phantom), the dust deflector 294 is configured to retain dust and debris in the space defined between the support wall 172 and the cover wall 272 and further configured to prevent transfer of dust and debris through the saw blade opening 4. The dust deflector 294 can be part of a dust deflector that is coupled to the riving knife 7, as described further below with reference to FIG. 12. As described above, with reference to FIG. 5 and the dust deflector 180, each one of the dust deflectors 280, 292, and 294 may be integrally formed with the cover wall 272.

Also depicted in FIG. 7 is a transparent window 296 provided on the cover wall 272 of the cover assembly 250. The transparent window 296 provides visual access to the blade chamber 262.

The dust deflectors 180 and 280 are separated by a lateral distance 290 (i.e., the dust deflectors 180 and 280 are not aligned). The dust deflectors 180 and 280 are also separated by an air gap 291, as depicted in FIGS. 8 and 9. By adjusting the vertical placement of the saw blade 6, the user is able to place the saw blade 6 at various positions with respect to the dust deflectors 180 and 280. The air gap 291 and the lateral distance 290 between the dust deflectors 180 and 280 can be configured to provide air turbulence as the saw blade 6 rotates between the dust deflectors 180 and 280, as depicted in FIG. 9 by the double arrows. The air gap 291 can also generate a lower pressure toward the bottom portion of the blade case 260, urging dust and debris downward into the dust channel 170. The air turbulence moves the air about the saw blade 6 and thereby maintains blade gullets (not shown) substantially free of dust and debris.

Figure 10:
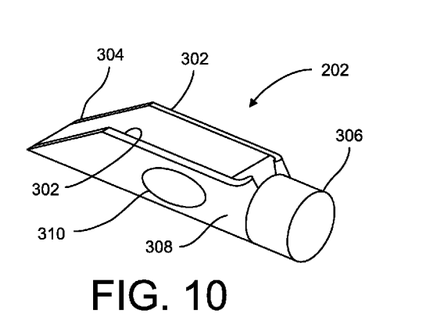
FIG. 10 depicts a perspective view of the removable dust port of FIG. 7.

Also depicted in FIG. 7 is the removable dust port 202. A perspective view of the removable dust port 202 is depicted in FIG. 10. The removable dust port 202 includes rails 302 which are configured to interface with glides 54 of the support wall 172 and the cover wall 272 for ease of assembly and disassembly of the removable dust port 202 from the blade case 260. Also included is a scoop portion 304 which forms a front end of the removable dust port 202. A rear end is formed by a cylindrical outlet 306 which can be coupled to a dust bag (not shown) or a vacuum system (not shown). When removed from the blade case 260, the scoop portion 304 may be used to scoop up dust and debris from a floor or a work surface.

The removable dust port includes side walls 308. On one of the side walls 308, a transparent window 310 is positioned. The transparent window is configured to provide visual access to the dust and debris which exits the table saw assembly 1 through the cylindrical outlet 306.

Figure 11:
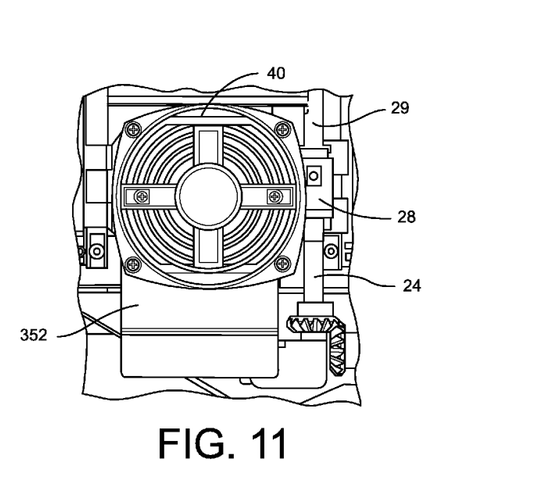
FIG. 11 depicts a dust deflector positioned below the motor of FIG. 2.

The motor 40 may also include a dust deflector 352 as depicted in FIG. 11. The dust deflector 352 is configured to prevent dust and debris from entering internal compartments of the motor 40. Additional detail of the height adjustment mechanism 20 is also depicted in FIG. 11, as described above with reference to FIG. 2. Specifically, the threaded member 28 is depicted as being coupled to the threaded portion 29 of the rod 24.

Figure 12:
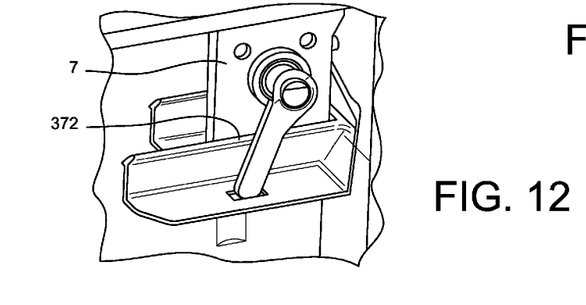
FIG. 12 depicts a dust deflector positioned around the riving knife of FIG. 2.

Referring to FIG. 12, a perspective view of a dust deflector 372 coupled to the riving knife 7 is depicted. The dust deflector 372 may be connected and be integrally formed with the dust deflector 294. The dust deflector 372 may be configured to allow the riving knife 7 to slide through an opening formed in the dust deflector 372 as the saw blade 6 is moved up and down. Furthermore, dust guards (not shown) may also be included on the table top 2 proximate to the saw blade opening 4 to further improve dust management.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A table saw comprising:
a housing defining an interior space;
a table top positioned on the housing over the interior space and including an opening configured to receive a saw blade;
a motor positioned under the table top within the interior space defined by the housing and configured to rotate the saw blade about an axis of rotation, wherein a midline that defines a front portion and a rear portion of the saw blade extends through the saw blade at the axis of rotation and is perpendicular with respect to the table top when the saw blade is perpendicular with respect to the table top;
a blade case positioned under the table top within the interior space defined by the housing, the blade case including a lower wall, a front wall, a rear wall, a first side wall, and a second side wall that collectively define a blade chamber for surrounding at least a lower portion of the saw blade and having an opening in a lower, rear portion of the blade chamber, the lower wall extending forwardly from the opening below a lower edge portion of the saw blade, the front wall extending upwardly from the lower wall in front of a leading edge portion of the saw blade, the rear wall extending upwardly from the opening behind a trailing edge of the saw blade, the first side wall extending between the front wall, the rear wall and the lower wall on a first side of the saw blade, the second side wall extending between the front wall, the rear wall and the lower wall on a second side of the saw blade; and
at least one dust deflector positioned within the blade chamber and extending between the first side wall and the second side wall substantially perpendicularly with respect to the saw blade, the at least one dust deflector including a lower deflector portion located between the axis of rotation and the lower wall of the blade case and an upper deflector portion located between the axis of rotation and the front wall of the blade case,
wherein the lower deflector portion and the upper deflector portion are spaced apart from the lower wall and the front wall, respectively, of the blade case to form a dust channel that runs along the front wall and the lower wall to the opening, and
wherein the at least one dust deflector defines an air gap through which the leading edge portion and the lower edge portion of the saw blade extend so that the leading edge portion and the lower edge portion of the saw blade are positioned in the dust channel when the saw blade is coupled to the motor.

2. The table saw of claim 1 wherein the at least one dust deflector includes a first dust deflector connected to the first side wall and extending toward the second side wall and a second dust deflector connected to the second side wall and extending toward the first side wall.

3. The table saw of claim 2 wherein the first side wall is provided by an undercarriage configured to carry the motor, and wherein the second side wall is provided by a cover member that is connected to the undercarriage.

4. The table saw of claim 2 wherein the first deflector includes an inner edge portion oriented toward the second side wall and the second deflector includes an inner edge portion oriented toward the first side wall, and wherein the air gap is provided between the inner edge portions of the first dust deflector and the second dust deflector, the air gap being sized and positioned to enable the saw blade to extend into the air gap and be positioned between the first dust deflector and the second dust deflector.

5. The table saw of claim 4 wherein one of the first dust deflector and the second dust deflector is positioned closer to the axis of rotation of the saw blade such so that the first and second deflectors are not aligned within the blade chamber.

6. The table saw of claim 1 wherein the motor extends through an open window in the first wall to the blade chamber, the midline defining a front portion and a rear portion of the open window, wherein the at least one deflector extends substantially along the front portion of the window in the first wall.

7. The table saw of claim 6 wherein the at least one dust deflector extends substantially from a top portion of the blade case to a dust outlet in the blade chamber.

8. The table saw of claim 1 wherein the blade chamber includes a dust outlet that leads to a removable dust port or a fixed dust port.

9. The table saw of claim 7 wherein the removable dust port includes a scoop portion.

10. The table saw of claim 7 wherein the removable dust port includes rails that engage glides on the blade case.

11. The table saw of claim 1 wherein the blade chamber includes at least one transparent window.

12. The table saw of claim 1 further comprising at least one rear dust deflector positioned in a rear upper portion of the blade chamber.

13. The table saw of claim 11 further comprising a riving knife positioned to the rear portion of the saw blade, wherein the rear dust deflector is connected to the riving knife.

14. The table saw of claim 1 wherein the at least one dust deflector extends through the midline in a continuous and uninterrupted manner.

* * * * *